US009661558B2

(12) United States Patent  (10) Patent No.: US 9,661,558 B2
Dominguez  (45) Date of Patent: May 23, 2017

(54) SERVICE CONSTRAINT ADVERTISEMENT AND DISCOVERY

(71) Applicant: Apple Inc., Cupertino, CA (US)

(72) Inventor: Charles F. Dominguez, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 323 days.

(21) Appl. No.: 13/719,004

(22) Filed: Dec. 18, 2012

(65) Prior Publication Data

US 2013/0322297 A1  Dec. 5, 2013

Related U.S. Application Data

(60) Provisional application No. 61/654,566, filed on Jun. 1, 2012.

(51) Int. Cl.
| H04W 4/00 | (2009.01) |
| H04W 48/16 | (2009.01) |
| H04W 8/00 | (2009.01) |
| H04W 4/08 | (2009.01) |
| H04W 4/20 | (2009.01) |

(52) U.S. Cl.
CPC ............ *H04W 48/16* (2013.01); *H04W 4/00* (2013.01); *H04W 4/008* (2013.01); *H04W 4/08* (2013.01); *H04W 4/206* (2013.01); *H04W 8/005* (2013.01)

(58) Field of Classification Search
CPC ....... H04W 4/008; H04W 4/08; H04W 8/005; H04W 4/00; H04W 4/206
USPC .................................. 370/252; 709/223–230
See application file for complete search history.

(56) References Cited

U.S. PATENT DOCUMENTS

| 6,788,702 | B1* | 9/2004 | Garcia-Luna-Aceves et al. .............................. 370/458 |
| 8,600,336 | B2* | 12/2013 | Meylan et al. ............... 455/346 |
| 8,656,015 | B2* | 2/2014 | Navasivasakthivelsamy .................... H04L 12/2809 709/200 |
| 8,929,806 | B2* | 1/2015 | Maguire ...................... 455/41.1 |
| 2005/0193106 | A1* | 9/2005 | Desai .................... H04L 69/329 709/223 |
| 2007/0141984 | A1* | 6/2007 | Kuehnel et al. ............. 455/41.2 |
| 2008/0151848 | A1* | 6/2008 | Fischer ................. H04W 8/005 370/338 |
| 2009/0274083 | A1* | 11/2009 | Wentink ........................ 370/311 |

(Continued)

*Primary Examiner* — Ricky Ngo
*Assistant Examiner* — Lan Huong Truong
(74) *Attorney, Agent, or Firm* — Sterne, Kessler, Goldstein & Fox, PLLC

(57) ABSTRACT

Various embodiments for service constraint advertisement and discovery are provided. Each wireless device in a group of wireless devices can multicast a service advertisement frame to advertise a service provided, a discovery request frame to request for a service, a discovery response frame in response of a discovery request frame if the wireless device can provide the requested service, or a discovery proxy response frame in response of a discovery request frame if another wireless device can provide the requested service. The frames include information related to one or more services and capabilities, availability schedule, frequency band in use, and other information. This allows a new device joining the group to accomplish device discovery and service discovery at the same time. This Abstract is submitted with the understanding that it will not be used to interpret or limit the scope or meaning of the claims.

41 Claims, 6 Drawing Sheets

(56) References Cited

U.S. PATENT DOCUMENTS

| | | | | |
|---|---|---|---|---|
| 2010/0322213 A1* | 12/2010 | Liu | ........................ | H04L 67/16 370/338 |
| 2011/0149806 A1* | 6/2011 | Verma | ................. | H04L 12/2809 370/255 |
| 2011/0170511 A1* | 7/2011 | Chen | ..................... | H04W 72/02 370/329 |
| 2013/0067068 A1* | 3/2013 | Hassan et al. | ................ | 709/224 |

* cited by examiner

US 9,661,558 B2

SERVICE CONSTRAINT ADVERTISEMENT AND DISCOVERY

RELATED APPLICATION

This application is a non-provisional application from, and hereby claims priority under 35 U.S.C. §119 to, U.S. provisional application No. 61/654,566, entitled "Service Constraint Advertisement and Discovery," by Charles F. Dominguez, which was filed 1 Jun. 2012, and which is incorporated herein by reference.

BACKGROUND

Field

The present disclosure generally relates to service discovery. More specifically, the present disclosure relates to peer-to-peer service constraint advertisement and discovery via wireless communications.

Related Art

Wireless-enabled portable devices, such as smart phones, tablet computers, notebook computers or the like, allow users to engage in a variety of activities using wireless communication. For example, a user can use a portable device to surf the Internet, participate in a video conference call, download and listen to music clips, download and view video clips, and/or exchange information (e.g., play games or exchange contact information) with other users of portable devices.

An emerging trend for such portable devices is peer-to-peer exchange between two or more portable devices without the need for wireless access points. In this regard, technologies and applications for peer-to-peer communication have been developed to allow portable devices in the vicinity of one another to engage directly in peer-to-peer information exchange and service rendering. Thus, ideally, when two or more people with portable devices capable of peer-to-peer communication are in the vicinity of one another, they would be able to engage in peer-to-peer activities using their portable devices. However, there may be situations where two portable devices capable of peer-to-peer communication are not able to engage in meaningful transactions due to, for example, one of the devices having an older version of software. Additionally, the two devices may have disjoint capabilities, e.g., one device is equipped for 5-GHz Wi-Fi while the other device is equipped for 2.4-GHz Wi-Fi, meaning that the devices may be incapable of direct wireless communication. When such devices are unable to communicate, it can result in a poor user experience.

Wi-Fi Direct is one standard developed to enable devices to engage in peer-to-peer communication. Using Wi-Fi direct, two devices in the vicinity of each other can perform device discovery and service discovery to enable the devices to determine if the devices are present and hosting a desired service (e.g., a game application, file transfer service, printer service, etc.). More specifically, using a "scan, listen, find" process in Wi-Fi Direct, each device performs a scan of a predetermined set of channels (sometimes called "social channels") in a random order to discover beacons transmitted by established devices on the channels, and in order to send probe requests to other devices that are discoverable and listening on the channel. Upon encountering another device's beacon frame or probe response, the scanning device can use information from the frame to determine the presence or availability of the device. Each device then sends unicast generic advertisement service (GAS) frames to the other device to perform service discovery.

However, Wi-Fi Direct has its own issues and inefficiencies. Firstly, because a device is unaware of the channel (or channels) used by another device to transmit advertising frames and the schedules of the devices may not be synchronized, the random scan of the channels in the set of channels may not encounter the advertising frame from the other device until multiple passes though the set of channels have been performed by the device. Thus, a device may need to search for a relatively long time to discover another device, which can be time- and power-consuming. Secondly, in the above-described approach, service discovery is unidirectional. This means that, after going through the above-described process, a first device may learn of a second device's presence or services but the second device may still have no knowledge of the first device's presence or services. That is, the second device may still be performing the scan of the set of channels to discover the first device. Thirdly, GAS frames are unicast frames. In other words, devices exchange service information in a one-to-one manner using GAS frames. Hence, after the first device sends one or more GAS frames to the second device only the first device, but not any other device, knows of the second device's services. When a group of users with a plurality of portable devices that desire to engage in peer-to-peer exchanges, exchanges based on unicast such as GAS frames would be very time and power consuming.

SUMMARY

Described herein are systems, apparatuses, methods, and techniques related to service constraint advertisement and discovery using multicast.

In one aspect, an advertiser device may receive a multicast discovery request frame from a discoverer device. The discovery request frame may include information indicative of a service requested by the discoverer device and information about the discoverer device that can be used by other devices to communicate with the discoverer device and provide the requested service to the discoverer device. The information about the discoverer device that can be used by other devices to communicate with the discoverer device and provide the requested service to the discoverer device may include at least one of the following: one or more IEEE 802.11 channels supported by the discoverer device in accessing the requested service, one or more IEEE 802.11 channels preferred by the discoverer device in accessing the requested service, one or more IEEE 802.11-level transports used by the discoverer device in accessing the requested service, and an availability schedule of the discoverer device for frame exchange.

In another aspect, a device may receive from a software client executed in the device a request for a remote service needed by the software client. The device may generate a discovery request frame. The discovery request frame may include information indicative of the service requested by the discoverer device and information about the discoverer device that can be used by remote devices to communicate with the discoverer device and provide the remote service to the discoverer device. The discoverer device may then multicast the discovery request frame. The information about the discoverer device that can be used by remote devices to communicate with the discoverer device and provide the remote service to the discoverer device may include at least one of the following: one or more IEEE 802.11 channels supported by the discoverer device in accessing the remote service, one or more IEEE 802.11 channels preferred by the discoverer device in accessing the remote service, one or more IEEE 802.11-level transports used by the discoverer device in accessing the remote service, and an availability schedule of the discoverer device for frame exchange.

In still another aspect, a proxy device may receive from a remote advertiser device a multicasted service advertisement frame. The service advertisement frame may include information indicative of a service provided by the advertiser device and information about the advertiser device that can be used by other devices to communicate with the advertiser device and access the service on the advertiser device. The information included in the service advertisement frame may be cached by the proxy device. The proxy device may also receive from a discoverer device a multicast discovery request frame. The discovery request frame may include information indicative of a service requested by the discoverer device and information about the discoverer device that can be used by other devices to communicate with the discoverer device and provide the service to the discoverer device. The proxy device may determine that the service requested by the discoverer device matches the service provided by the advertiser device, and generate a discovery proxy response frame. The discovery proxy response frame may include information indicative of the service provided by the advertiser device and information about the advertiser device that can be used by other devices to communicate with the advertiser device and access the service on the advertiser device. The proxy device may use the information from the discoverer device's discovery request frame to configure the proxy device for multicasting the discovery proxy response frame at a time and in a manner supported by the discoverer device. In some embodiments, the proxy device may delay responding to the discoverer device for a predetermined time to enable the advertiser device to respond (and may monitor for responses from the advertiser device during that time to determine if the advertiser device has responded). When the advertiser device responds, the proxy device may not respond.

In a further aspect, a device may receive one or more multicasted discovery request frames, one or more multicasted discovery response frames, or one or more multicasted discovery proxy response frames on a plurality of IEEE 802.11 channels. Each of the received one or more frames may include information related to a respective device that multicasted the respective frame. The device may cache the information included in the received frames, and select an availability schedule for itself based at least in part on the cached information.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE FIGURES

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
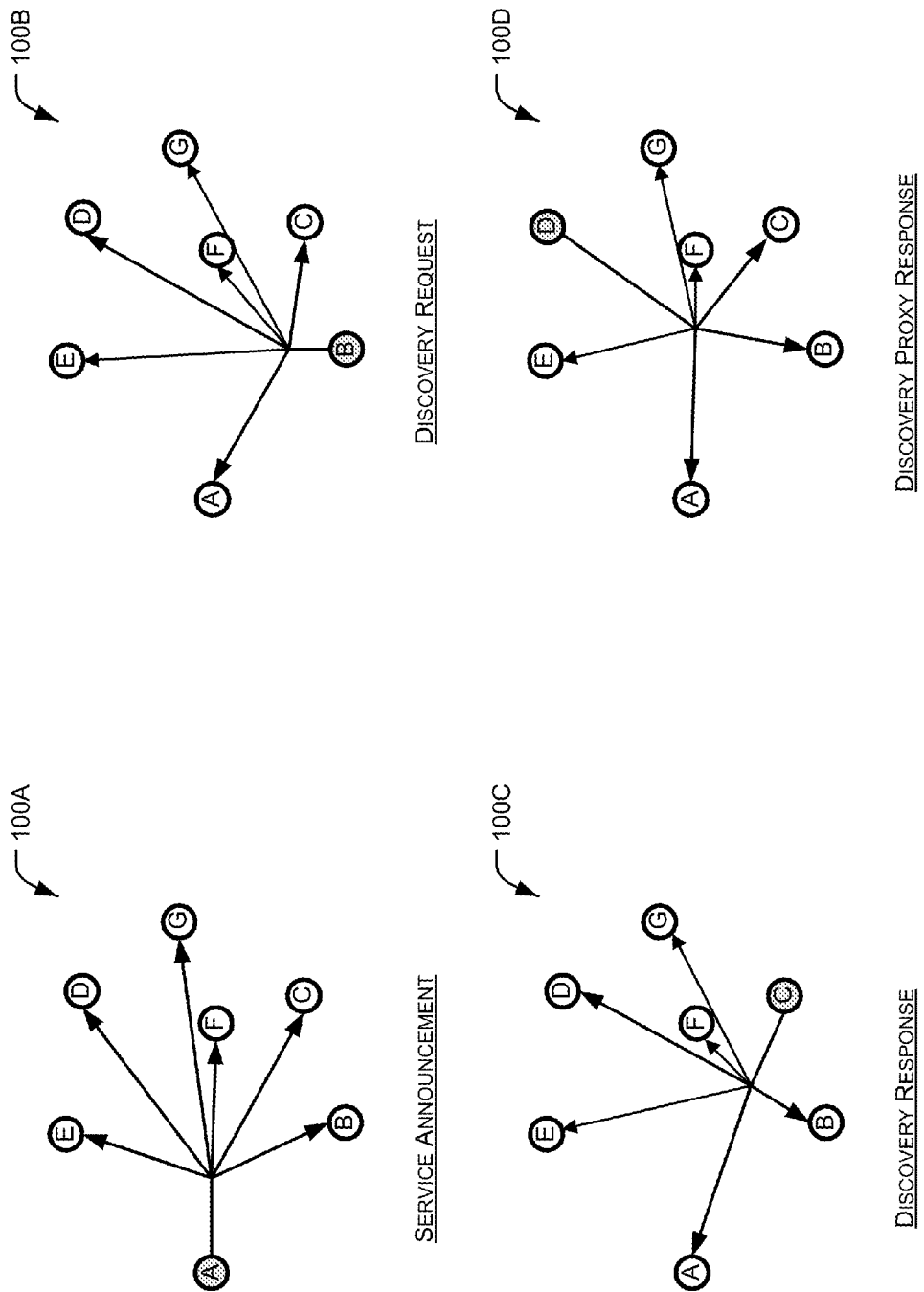
FIG. 1 is a diagram showing various scenarios in an example environment for service constraint advertisement and discovery using multicast in accordance with the present disclosure.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by an electronic device with computing capabilities. For example, the computer-readable storage medium can include volatile memory or non-volatile memory, including flash memory, random access memory (RAM, SRAM, DRAM, RDRAM, DDR/DDR2/DDR3 SDRAM, etc.), magnetic or optical storage mediums (e.g., disk drives, magnetic tape, CDs, DVDs), or other mediums capable of storing data structures or code. Note that in the described embodiments, the computer-readable storage medium does not include non-statutory computer-readable storage mediums such as transmission signals.

The methods and processes described in this detailed description can be included in hardware modules. For example, the hardware modules can include, but are not limited to, processors, application-specific integrated circuit (ASIC) chips, field-programmable gate arrays (FPGAs), and other programmable-logic devices. When the hardware modules are activated, the hardware modules perform the methods and processes included within the hardware modules. In some embodiments, the hardware modules include one or more general-purpose circuits that are configured by executing instructions (program code, firmware, etc.) to perform the methods and processes.

The methods and processes described in the detailed description section can be embodied as code and/or data that can be stored in a computer-readable storage medium as described above. When an electronic device with computing capabilities reads and executes the code and/or data stored on the computer-readable storage medium, the electronic device performs the methods and processes embodied as data structures and code and stored within the computer-readable storage medium. For example, in some embodiments, a processing subsystem can read the code and/or data from a memory subsystem that comprises the computer-readable storage medium and can execute code and/or use the data to perform the methods and processes.

The following description may refer to "some embodiments." "Some embodiments" describes a subset of all of the possible embodiments, but does not always specify the same subset of the embodiments.

Example Environment

FIG. 1 illustrates various scenarios in an example environment for service constraint advertisement and discovery using multicast in accordance with the present disclosure. For illustrative purpose, in each of the scenarios 100A, 100B, 100C and 100D, there are a plurality of wireless devices A, B, C, D, E, F and G. In the illustrated examples, some, but not necessarily all, of wireless devices A-G participate in multicasting frames for peer-to-peer communications.

When a new device first joins a medium, the device listens to a set of channels to determine what other devices are around (i.e., available for communicating with the new device). For example, referring to FIG. 1, when the wireless device A first joins a medium, such as the 2.4-GHz frequency band of Wi-Fi for example, wireless device A scans a number of channels, also referred to as social channels herein, including channels 1, 6 and 11 for example, to listen for frame exchanges on the scanned channels. The wireless device A may listen on each of the scanned channel for a period of time, e.g., 500 msec, before listening on another channel. After listening to the scanned channels for a while, the wireless device A may discover a number of other devices, such as wireless devices B-G, that are around and exchanging frames. The wireless device A may also determine that one of the scanned channels is most popular as that channel is used by the most number of devices, and may select that channel not only for further listening but also as an active channel on which to provide and/or access one or more services. Of course, after selecting a channel as the active channel on which to provide and/or access one or more services, wireless device A may still scan and listen on other channels. This "listen and find" process is performed by each wireless device that joins a medium. Accordingly, over time it is expected that a majority or all of the wireless devices converge on one channel. Details of an example implementation of the "listen and find" process and embodiments thereof will be described with reference to FIG. 2 below.

Under the proposed techniques of the present disclosure, there are several types of frames, including service advertisement frames, discovery request frames, discovery response frames, and a discovery proxy response frames. Each of these types of frames will be explained further below. Regardless of the type, a frame transmitted by a transmitting device may include at least one of the following pieces of information about the transmitting device or another device: (1) one or more services provided by or requested by the transmitting device or another device, (2) a frequency band in use, (3) one or more IEEE 802.11 channels supported by the transmitting device or another device in providing or accessing the one or more services provided or requested, (4) one or more IEEE 802.11 channels preferred by the transmitting device or another device in providing or accessing the one or more services provided or requested, (5) one or more IEEE 802.11-level transports used by the transmitting device or another device, (6) one or more capabilities of the transmitting device or another device, and (7) an availability schedule of the transmitting device or another device for frame exchange. Such information can be used by other devices to communicate with the transmitting device or another device to provide a requested service to or access a service provided by the transmitting device or another device. Each of the wireless devices listen for, receive, and multicast frames during its respective availability schedule.

Accordingly, a device listening to one or more social channels to perform device discovery not only discover other devices but also, at the same time, discover other information about the discovered devices such as the services provided/requested by other devices, availability schedule and capabilities of the discovered devices, etc. That is, the proposed techniques of the present disclosure allow devices to perform device discovery and service discovery (as well as constraint discovery) at the same time since the frames transmitted by the devices include information related to services, capabilities, availability schedules and IEEE 802.11-related information. In contrast, under conventional approaches, devices perform device discovery first and then service exchange thereafter to learn of the services provided by other devices.

Moreover, under the proposed techniques, the frames transmitted by the wireless devices are transmitted by multicast as opposed to unicast or broadcast. A device receiving the frames can cache the information contained in the received frames and therefore can quickly learn of the availability, capabilities, constraints and services of other devices (and can possibly learn about the availability, capabilities, constraints and services of other devices without itself making a request, as the information is multicast). On the other hand, under conventional approaches, such information exchange is typically done on a one-to-one basis, e.g., by unicast, and hence it is both time consuming and power consuming. In comparison, both time and power can be saved with the proposed techniques.

Scenario 100A relates to service advertisement in accordance with the present disclosure. After a wireless device joins a medium and selects a channel to listen on and participate in, the wireless device may issue a service advertisement by multicasting a service advertisement frame that can be received by a number of other wireless devices. Continuing with the example above, wireless device A may multicast a service advertisement frame to other available wireless devices, as shown in FIG. 1, to advertise one or more services provided by the wireless device A or, more specifically, by one or more software clients executed in the wireless device A. Details of an example implementation of service advertisement and embodiments thereof will be described with reference to FIG. 4 below.

Scenario 100B relates to discovery request in accordance with the present disclosure. When a wireless device is in need of a service, e.g., when a software client executed in the wireless device indicates a need for a service, the wireless device may multicast a discovery request frame that can be received by a number of other wireless devices. For example, when a software client executed in wireless device B is in need of a service, the wireless device B may multicast a discovery request frame to other available wireless devices, as shown in FIG. 1, to advertise the request for such service. Details of an example implementation of discovery request and embodiments thereof will be described with reference to FIG. 3 below.

Scenario 100C relates to discovery response in accordance with the present disclosure. Upon receiving a discovery request frame and determining that it can provide the requested service, a wireless device may multicast a discovery response frame in response. For example, when wireless device C receives the discovery request frame from wireless device B, the wireless device C may determine that it can provide the service requested in the discovery request frame. Accordingly, the wireless device C may generate a discovery response frame and multicast the discovery response frame that can be received by a number of other wireless devices. Details of an example implementation of discovery response and embodiments thereof will be described with reference to FIG. 4 below.

Scenario 100D relates to discovery proxy response in accordance with the present disclosure. Upon receiving a discovery request frame and determining that another device can provide the requested service, a wireless device may multicast a discovery proxy response frame in response. For example, when wireless device D receives the discovery request frame from wireless device B, the wireless device D may determine that the wireless device C or A can provide the service requested in the discovery request frame. Accordingly, the wireless device D may generate a discovery proxy response frame and multicast the discovery proxy response frame that can be received by a number of other wireless devices. Details of an example implementation of discovery proxy response and embodiments thereof will be described with reference to FIG. 5 below.

Example Processes

For each of the processes presented herein, the order in which the process blocks is described is not intended to be construed as a limitation, and any number of the described process blocks may be combined in any order to implement the process, or alternate process. Additionally, individual blocks may be deleted from the process without departing from the spirit and scope of the subject matter described herein. Furthermore, the process may be implemented in any suitable hardware, software, firmware, or a combination thereof, without departing from the scope of the present disclosure.

Figure 2:
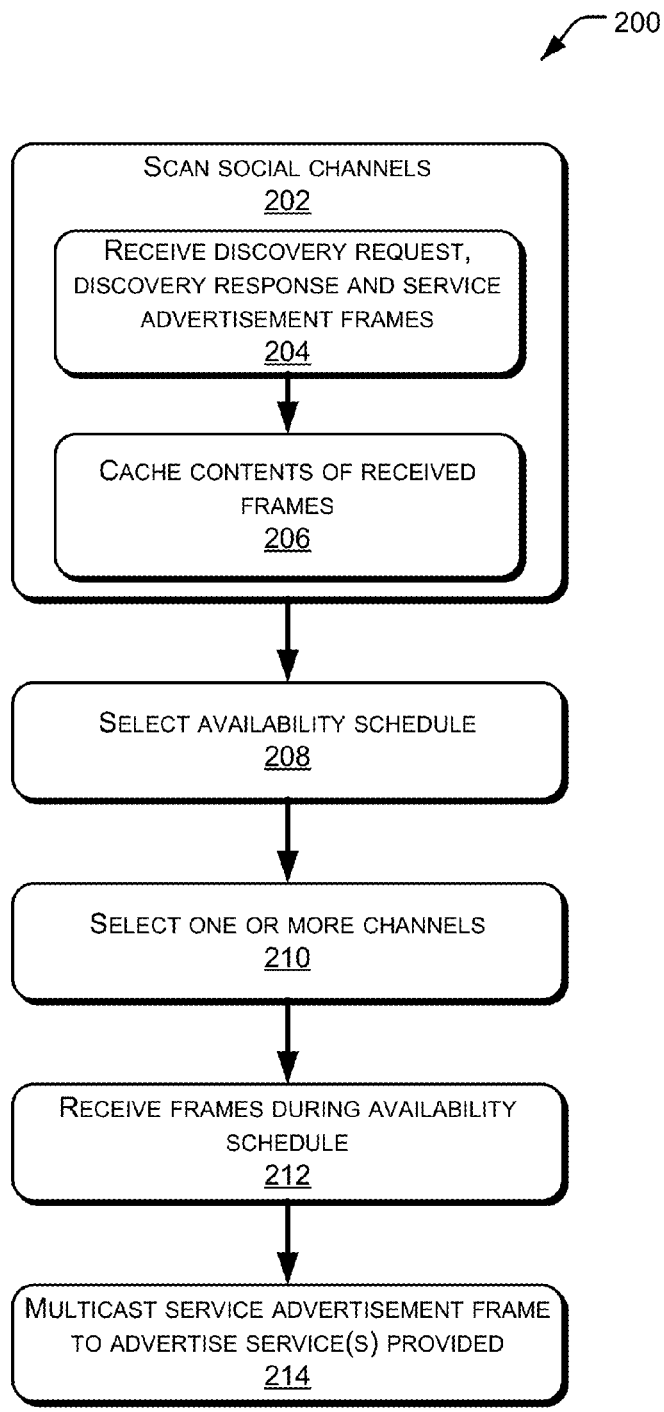
FIG. 2 is a flow chart showing a process for service constraint advertisement and discovery using multicast in accordance with an embodiment of the present disclosure.

FIG. 2 illustrates a process 200 for service constraint advertisement and discovery using multicast in accordance with an embodiment of the present disclosure. Process 200 depicts a scenario in which a wireless device, e.g., a Wi-Fi capable device, joins a group of one or more other wireless devices to engage in service constraint advertisement and discovery using multicast. Process 200 begins at block 202.

At block 202, the wireless device scans one or more social channels. For example, when the wireless device A as a new device joins the group of wireless devices B-G, the wireless device A may scan a number of channels such as one or more of the common channels 1, 6, 11 and any other channel. Block 202 may include sub-blocks 204 and 206. At block 204, the wireless device listens on the one or more scanned channels for frame exchanges. The wireless device may receive one or more multicasted frames including one or more discovery request frames, discovery response frames, discovery proxy response frames, and service advertisement frames on the one or more social channels. At block 206, the wireless device caches information contained in the received one or more frames. For example, the wireless device A may scan a number of channels, such as channels 1, 6 and 11, and receive frames transmitted by one or more of the wireless devices B-G. The wireless device A may cache the information contained in the received frames. In one embodiment, the cached information may be kept for a defined period of time and may be deleted or overwritten upon expiration of the defined period of time.

Each of the received multicasted frames may include information that indicates one or more services provided or requested by the transmitting device that transmits the respective frame or by another device and at least one of the following pieces of information about a specific device such as the transmitting device or another device: a frequency band in use, one or more IEEE 802.11 channels supported by the transmitting device or another device in providing or accessing the one or more services provided or requested, one or more IEEE 802.11 channels preferred by the transmitting device or another device in providing or accessing the one or more services provided or requested, one or more IEEE 802.11-level transports used by the transmitting device or another device, one or more capabilities of the transmitting device or another device, and an availability schedule of the participating device or another device for frame exchange. Such information can be used by other devices to communicate with the specific device to provide a requested service to or access a service provided by the specific device.

The one or more IEEE 802.11-level transports may include one or more of an IEEE 802.11 extended service set (ESS), an IEEE 802.11 independent basic service set (iBSS), and Wi-Fi Direct. The availability schedule of the transmitting device may comprise one or more IEEE 802.11 channels on which the transmitting device will be available for frame exchange, a duration for an availability window during which the transmitting device will be available on the one or more IEEE 802.11 channels, a start time at which the availability window of the transmitting device starts, and a number of times the availability window of the transmitting device will repeat.

At block 208, the wireless device selects its availability schedule based at least in part on the cached information. For example, based on the information in the received one or more frames, the wireless device A may select an availability schedule for itself to coincide with that of one or more of the wireless devices B-G that transmitted the one or more frames received by the wireless device A. The process 200 may optionally include a block 210.

At block 210, the wireless device selects one or more of the scanned social channels as the channel(s) to use for further participation in the service constraint advertisement and discovery. For example, based on the information received, the wireless device A may determine that IEEE 802.11 channel 1 is used and preferred by a majority or all of the wireless devices B-G and thus select IEEE 802.11 channel 1 as the active channel for further participation and listening. In one embodiment, regardless of the channel selected, the wireless device may continue to scan one or more of the other channels.

At block 212, the wireless device receives one or more multicasted frames during its availability schedule. For example, the wireless device A may receive, from one or more of the wireless devices B-G, one or more discovery request frames, discovery response frames and/or service advertisement frames. In one embodiment, the wireless device caches the information for a defined period of time and deletes or overwrites the cached information upon expiration of the defined period of time. After the selection of its availability schedule, the wireless device may receive and/or multicast one or more multicasted frames, including one or more discovery request frames, discovery response frames and/or service advertisement frames, during its availability schedule.

At block 214, the wireless device multicasts a service advertisement frame to advertise one or more services provided by the wireless device. For example, a processor in the wireless device A may receive a request to advertise a service provided by a software client executed in the wireless device A. Subsequently, the wireless device A may generate a service advertisement frame that includes information indicative of the service provided by the wireless device A and information about the wireless device that can be used by other devices to communicate with the wireless device and access the service on the wireless device. The information about the wireless device that can be used by other devices to communicate with the wireless device and access the service on the wireless device may include at least one of the following pieces of information: a frequency band used by the wireless device A, one or more IEEE 802.11 channels supported by the wireless device A in providing the service, one or more IEEE 802.11 channels preferred by the wireless device A in providing the service, one or more IEEE 802.11-level transports used by the wireless device A in providing the service, one or more capabilities of the wireless device A, and an availability schedule of the wireless device A for frame exchange. The wireless device A may then multicast the service advertisement frame that can be received by a number of other wireless devices (e.g., devices B-G, assuming that the devices are in range of device A's wireless signal) during an availability window during which the wireless device A is available on one or more of the IEEE 802.11 channels supported by the wireless device A.

Figure 3:
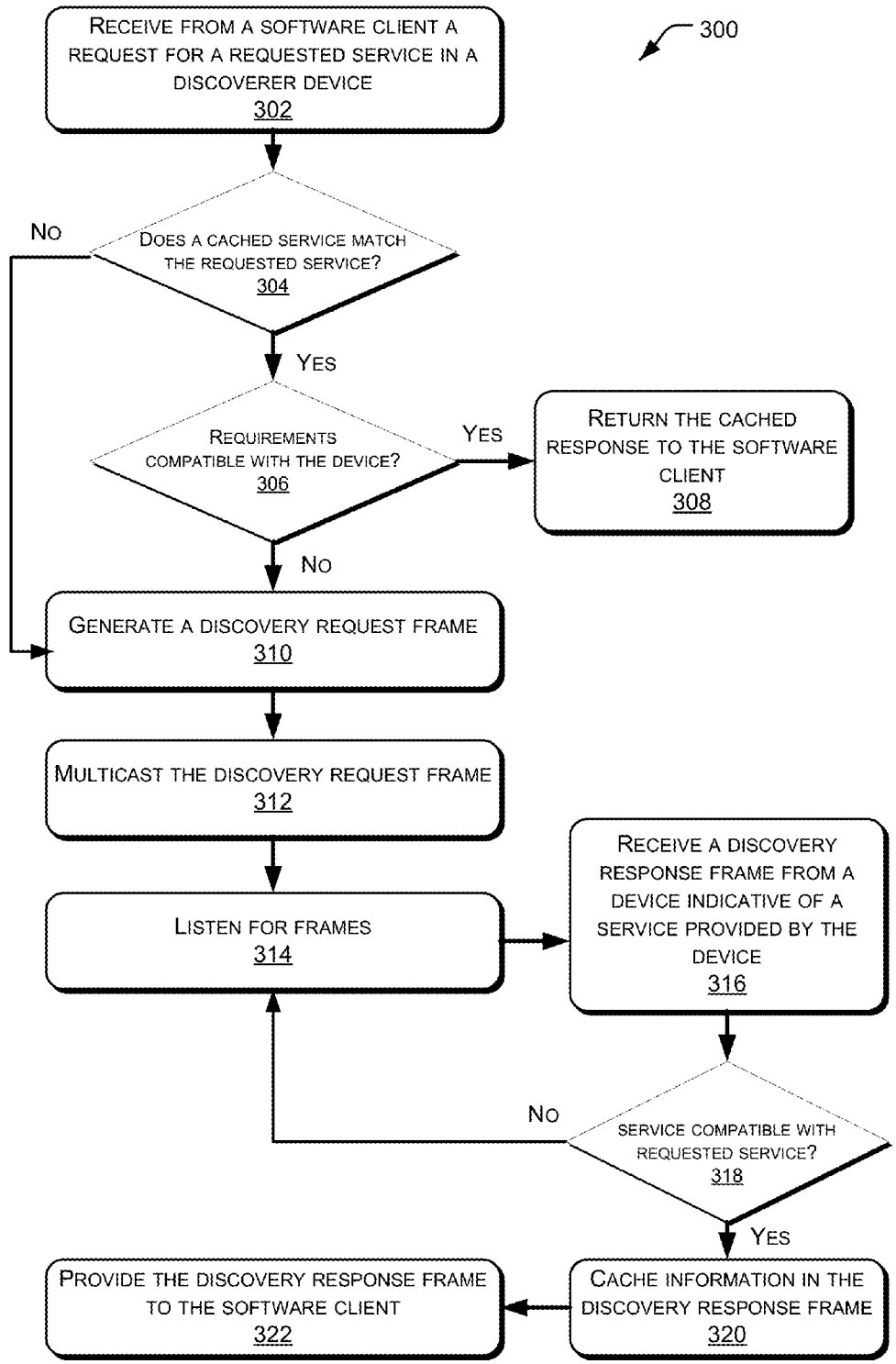
FIG. 3 is a flow chart showing a process related to discovery request for service constraint advertisement and discovery using multicast in accordance with an embodiment of the present disclosure.

FIG. 3 illustrates a process 300 related to discovery request for service constraint advertisement and discovery using multicast in accordance with an embodiment of the present disclosure. Process 300 depicts a scenario in which a wireless device in need of a service multicasts a discovery request frame. Process 300 begins at block 302.

At block 302, a processor in the wireless device (a "discoverer device") receives, from a software client executed in the wireless device, a request for a service needed by the software client on the discoverer device. For example, a processor in the wireless device B may receive, from a software client executed in the wireless device B, a request for a service needed by the software client.

The process 300 may optionally include operations as shown in blocks 304-308. At block 304, the wireless device determines whether a cached frame includes a service that matches the requested service. For example, the wireless device B may examine the frames in its cache to determine whether any of the cached frames includes a service that matches the service as requested by the software client in the wireless device B.

At block 306, in an event that the cached frame includes a service that matches the requested service and the requirements for using the service included in the cached frame are compatible with the current device, the process 300 proceeds to block 308. At block 308, the processor of the wireless device returns the cached frame to the software client. For example, when the wireless device B determines that a cached frame includes a service that matches the requested service and that requirements for using such service included in the cached frame are compatible with the current device, the processor of the wireless device B may return the cached frame to the software client in the wireless device B. In an event that the cached frame does not include a service that matches the requested service or requirements for using the service included in the cached frame are not compatible with the current device, the process 300 proceeds to block 310.

At block 310, the wireless device generates a discovery request frame that includes information indicative of the service requested by the wireless device and information about the wireless device that can be used by other device to communicate with the wireless device and provide the service to the wireless device. The information about the wireless device that can be used by other device to communicate with the wireless device and provide the service to the wireless device may include at least one of the following pieces of information: a frequency band used by the wireless device, one or more IEEE 802.11 channels supported by the wireless device in accessing the second service, one or more IEEE 802.11 channels preferred by the wireless device in accessing the second service, one or more IEEE 802.11-level transports used by the wireless device in accessing the second service, one or more capabilities of the wireless device, and an availability schedule of the wireless device for frame exchange. For example, the wireless device B may generate a discovery request frame that includes some or all of the information listed above.

In one embodiment, the one or more IEEE 802.11-level transports used by the wireless device in accessing the second service comprise one or more of an IEEE 802.11 extended service set (ESS), an IEEE 802.11 independent basic service set (iBSS), and Wi-Fi Direct.

In one embodiment, the availability schedule of the wireless device comprises one or more IEEE 802.11 channels on which the wireless device will be available for frame exchange, a duration for an availability window during which the wireless device will be available on the one or more IEEE 802.11 channels, a start time at which the availability window of the wireless device starts, and a number of times the availability window of the wireless device will repeat.

At block 312, the wireless device multicasts the discovery request frame. For example, the wireless device B may multicast the discovery request frame that can be received by a number of other wireless devices.

In one embodiment, the wireless device multicasts the discovery request frame when at least one of the following is true: (1) at least a minimum amount of time remains in the availability schedule for the wireless device on the one or more IEEE 802.11 channels supported by the wireless device, and (2) the discovery request frame is sent at a data rate equal to or higher than a threshold data rate.

The process 300 may optionally include additional operations as shown in blocks 314-322.

At block 314, the wireless device listens for frames transmitted from the other wireless devices. For example, after multicasting the discovery request frame the wireless device B may listen for frames from another wireless device (e.g., any one of wireless devices A and C-G).

At block 316, the wireless device receives from an advertiser device a multicasted discovery response frame. The discovery response frame may include information indicative of a remote service provided by the advertiser device and information about the advertiser device that can be used by other devices to communicate with the advertiser device and access the advertised service on the advertiser device. The information about the advertiser device that can be used by other devices to communicate with the advertiser device and access the remote service on the advertiser device may include at least one of the following pieces of information: a frequency band used by the advertiser device, one or more IEEE 802.11 channels supported by the advertiser device in providing the service, one or more IEEE 802.11 channels preferred by the advertiser device in providing the service, one or more IEEE 802.11-level transports used by the advertiser device in providing the service, one or more capabilities of the advertiser device, and an availability schedule of the advertiser device for frame exchange. For example, the wireless device B may receive a discovery response frame from the wireless device C, and the discovery response frame may include some or all of the information listed above.

At block 318, the wireless device determines whether the discovered service is compatible with the requested service. For example, the wireless device B may determine the compatibility of the discovered service provided by the wireless device C with respect to the requested service. In an event that the discovered service is compatible with the requested service, the process 300 proceeds to block 320 or block 322; otherwise the process 300 returns to block 314.

At block 320, the wireless device caches the information included in the discovery response frame from the discovered device. For example, once the wireless device B determines that the discovered service provided by the wireless device C is compatible with the requested service, the wireless device B may cache the information included in the discovery response frame received from the wireless device C.

At block 322, the processor in the wireless device provides at least some of the information from the discovery response frame to the software client. For example, the processor in the wireless device B may provide some of the information from the discovery response frame to the software client.

In one embodiment, at block 316, instead of receiving a discovery response frame the wireless device receives a discovery proxy response frame multicasted from a proxy device about the advertiser device, the service provided by the advertiser device, and other information related to the advertiser device. For example, the wireless device B may receive a discovery proxy response frame multicasted from the wireless device D. The discovery proxy response frame from the wireless device D may include information indicative of a service provided by the wireless device C and information about the wireless device C that can be used by other wireless devices to communicate with the wireless device C and access the service on the wireless device C. The information about the wireless device C that can be used by other wireless devices to communicate with the wireless device C and access the service on the wireless device C may include at least one of the following pieces of information: a frequency band used by the wireless device C, one or more IEEE 802.11 channels supported by the wireless device C in providing the service, one or more IEEE 802.11 channels preferred by the wireless device C in providing the service, one or more IEEE 802.11-level transports used by the wireless device C in providing the service, one or more capabilities of the wireless device C, and an availability schedule of the wireless device C for frame exchange.

Figure 4:
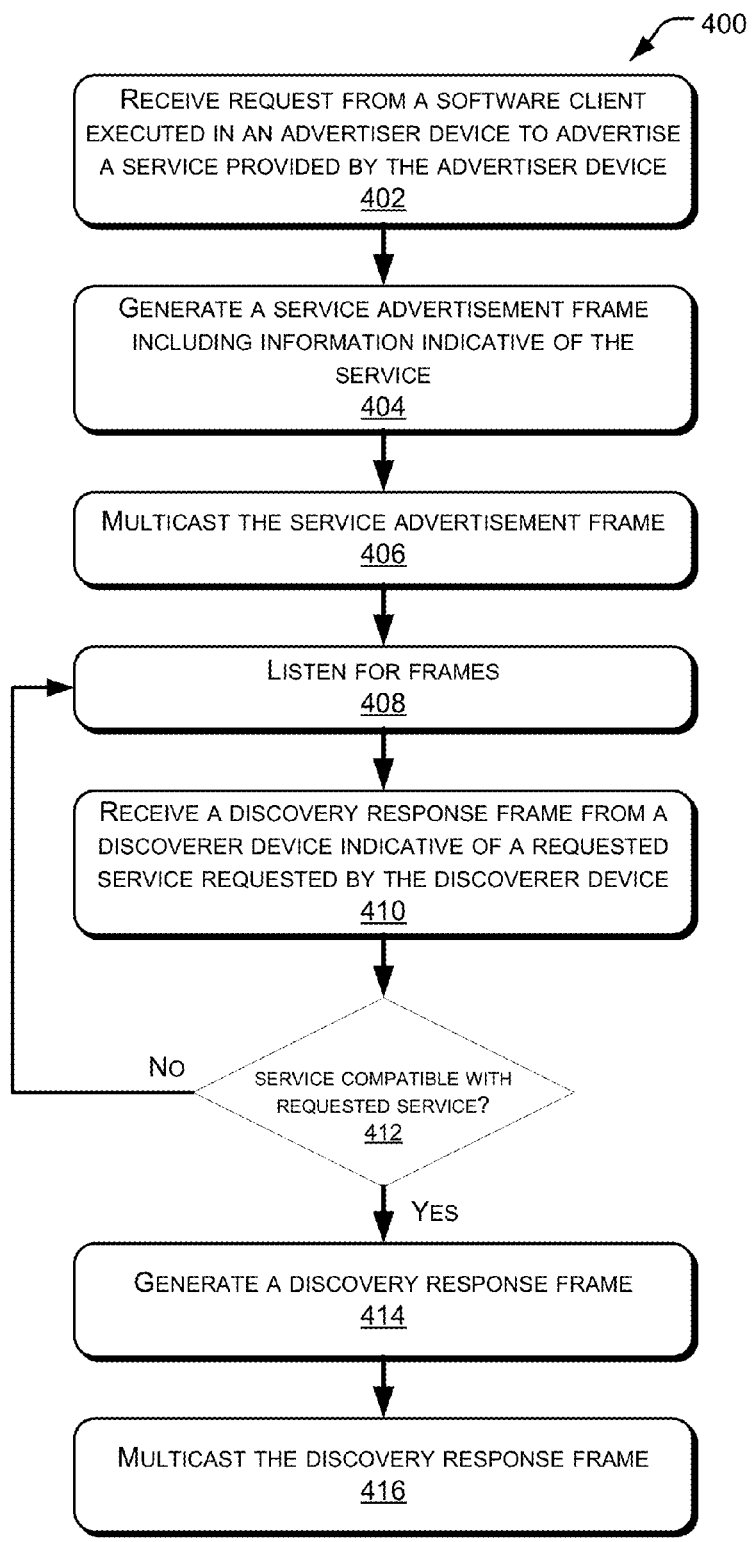
FIG. 4 is a flow chart showing a process related to service advertisement and discovery response for service constraint advertisement and discovery using multicast in accordance with an embodiment of the present disclosure.

FIG. 4 illustrates a process 400 related to service advertisement and discovery response for service constraint advertisement and discovery using multicast in accordance with an embodiment of the present disclosure. Process 400 depicts a scenario in which a wireless device multicasts a service advertisement frame and a discovery response frame. Process 400 begins at block 402.

At block 402, a processor in the wireless device (an "advertiser device") receives from a software client executed in the wireless device a request to advertise a service provided by the software client on the advertiser device. For example, a software client in the wireless device A may indicate that a service can be provided by the wireless device A.

At block 404, the wireless device generates a service advertisement frame that includes information indicative of the service provided by the wireless device and information about the wireless device that can be used by other wireless devices to communicate with the wireless device and access the service on the wireless device. The information about the wireless device that can be used by other wireless devices to communicate with the wireless device and access the service on the wireless device may include at least one of the following pieces of information: a frequency band used by the wireless device, one or more IEEE 802.11 channels supported by the wireless device in providing the service, one or more IEEE 802.11 channels preferred by the wireless device in providing the service, one or more IEEE 802.11-level transports used by the wireless device in providing the service, one or more capabilities of the wireless device, and an availability schedule of the wireless device for frame exchange. For example, the wireless device A may generate a service advertisement frame that includes some or all of the information listed above.

At block 406, the wireless device multicasts the service advertisement frame. In one embodiment, the wireless device multicasts the service advertisement frame during an availability window during which the wireless device is available on one or more of the IEEE 802.11 channels supported by the wireless device. For example, the wireless device A may multicast its service advertisement frame that can be received by a number of other wireless devices during an availability window during which the wireless device A is available on one or more of the IEEE 802.11 channels supported by the wireless device A.

At block 408, the wireless device listens for frames from other wireless devices. For example, the wireless device A may listen for discovery request frames from any of the wireless devices (i.e., wireless devices B-G) that requests for a service matching the service provided by the wireless device A.

At block 410, the wireless device receives a multicasted discovery request frame from a discoverer device, the discovery request frame including information indicative of a service requested by the discoverer device and information about the discoverer device that can be used by other devices to communicate with the discoverer device and provide the requested service to the discoverer device. The information about the discoverer device that can be used by other device to communicate with the discoverer device and provide the requested service to the discoverer device may include at least one of the following pieces of information: a frequency band used by the discoverer device, one or more IEEE 802.11 channels supported by the discoverer device in accessing the requested service, one or more IEEE 802.11 channels preferred by the discoverer device in accessing the requested service, one or more IEEE 802.11-level transports used by the discoverer device in accessing the requested service, one or more capabilities of the discoverer device, and an availability schedule of the discoverer device for frame exchange. For example, the wireless device A may receive a discovery request frame from the wireless device B requesting for a second service.

In one embodiment, the one or more IEEE 802.11-level transports used by the second device in accessing the second service comprise one or more of an IEEE 802.11 extended service set (ESS), an IEEE 802.11 independent basic service set (iBSS), and Wi-Fi Direct.

In one embodiment, the availability schedule of the discoverer device comprises one or more IEEE 802.11 channels on which the discoverer device will be available for frame exchange, a duration for an availability window during which the discoverer device will be available on the one or more IEEE 802.11 channels, a start time at which the availability window of the discoverer device starts, and a number of times the availability window of the discoverer device will repeat.

In one embodiment, the wireless device caches the information included in the discovery request frame.

At block 412, the wireless device determines whether the service requested by the discoverer device matches the service provided by the wireless device. For example, the wireless device A may determine whether the service requested by the wireless device B matches the service provided by the wireless device A. If the determination result is negative, the process 400 returns to block 408 and the wireless device continues to listen for frames from the other wireless devices. If the determination result is positive, the process 400 proceeds to block 414.

At block 414, the wireless device generates a discovery response frame that includes information indicative of the service provided by the wireless device and information about the wireless device that can be used by other wireless devices to communicate with the wireless device and access the service on the wireless device. The information about the wireless device that can be used by other wireless devices to communicate with the wireless device and access the service on the wireless device may include at least one of the following pieces of information: a frequency band used by the wireless device, one or more IEEE 802.11 channels supported by the wireless device in providing the first service, one or more IEEE 802.11 channels preferred by the wireless device in providing the first service, one or more IEEE 802.11-level transports used by the wireless device in providing the first service, one or more capabilities of the wireless device, and an availability schedule of the wireless device for frame exchange. For example, the wireless device A may generate a discovery response frame in response to determining that the second service requested by the wireless device B matches the first service provided by the wireless device A.

In one embodiment, the wireless device generates the discovery response frame when at least one of the following is true: (1) at least a minimum amount of time remains in the availability schedule for the second device on the one or more IEEE 802.11 channels supported by the second device, and (2) the discovery request frame was received at a data rate equal to or higher than a threshold data rate.

In one embodiment, one or more IEEE 802.11-level transports used by the wireless device in providing the first service comprise one or more of an IEEE 802.11 extended service set (ESS), an IEEE 802.11 independent basic service set (iBSS), and Wi-Fi Direct.

In one embodiment, the availability schedule of the wireless device comprises one or more IEEE 802.11 channels on which the wireless device will be available for frame exchange, a duration for an availability window during which the wireless device will be available on the one or more IEEE 802.11 channels, a start time at which the availability window of the wireless device starts, and a number of times the availability window of the wireless device will repeat.

At block 416, the wireless device multicasts the discovery response frame. For example, the wireless device A may multicast the discovery response frame that can be received by a number of other wireless devices. Prior to multicasting the discovery response frame, the wireless device may use the information from the discovery request frame about the discoverer device that can be used by other devices to communicate with the discoverer device and provide the requested service to the discoverer device to configure the wireless device for multicasting the discovery response frame.

In one embodiment, the wireless device carries out operations of blocks 412-416 for a defined duration. In other words, upon expiration of the defined period of time, the wireless device would not generate or multicast a discovery response frame as described above. In such case, another wireless device, such as the wireless device D, may generate and multicast a discovery proxy response frame to advertise for the wireless device A. In another embodiment, the wireless device may determine that a remote advertiser device provides a service that matches the service requested by the a remote discoverer device based on cached information about the remote advertiser device, for example from a service advertisement frame or a discovery response frame multicasted from the remote advertiser device previously. The cached information may include information indicative of the service provided by the remote advertiser device and information about the remote advertiser device that can be used by other devices to communicate with the remote advertiser device and access the service on the remote advertiser device. The wireless device may generate a discovery proxy response frame that includes the information indicative of the service provided by the remote advertiser device and the information about the remote advertiser device that can be used by other devices to communicate with the remote advertiser device and access the service on the remote advertiser device. Subsequently, the wireless device may use the information from the discovery request frame about the remote discoverer device that can be used by other devices to communicate with the remote discoverer device and provide the requested service to the remote discoverer device to configure the wireless device for multicasting the discovery proxy response frame, and then multicast the discovery proxy response frame.

Figure 5:
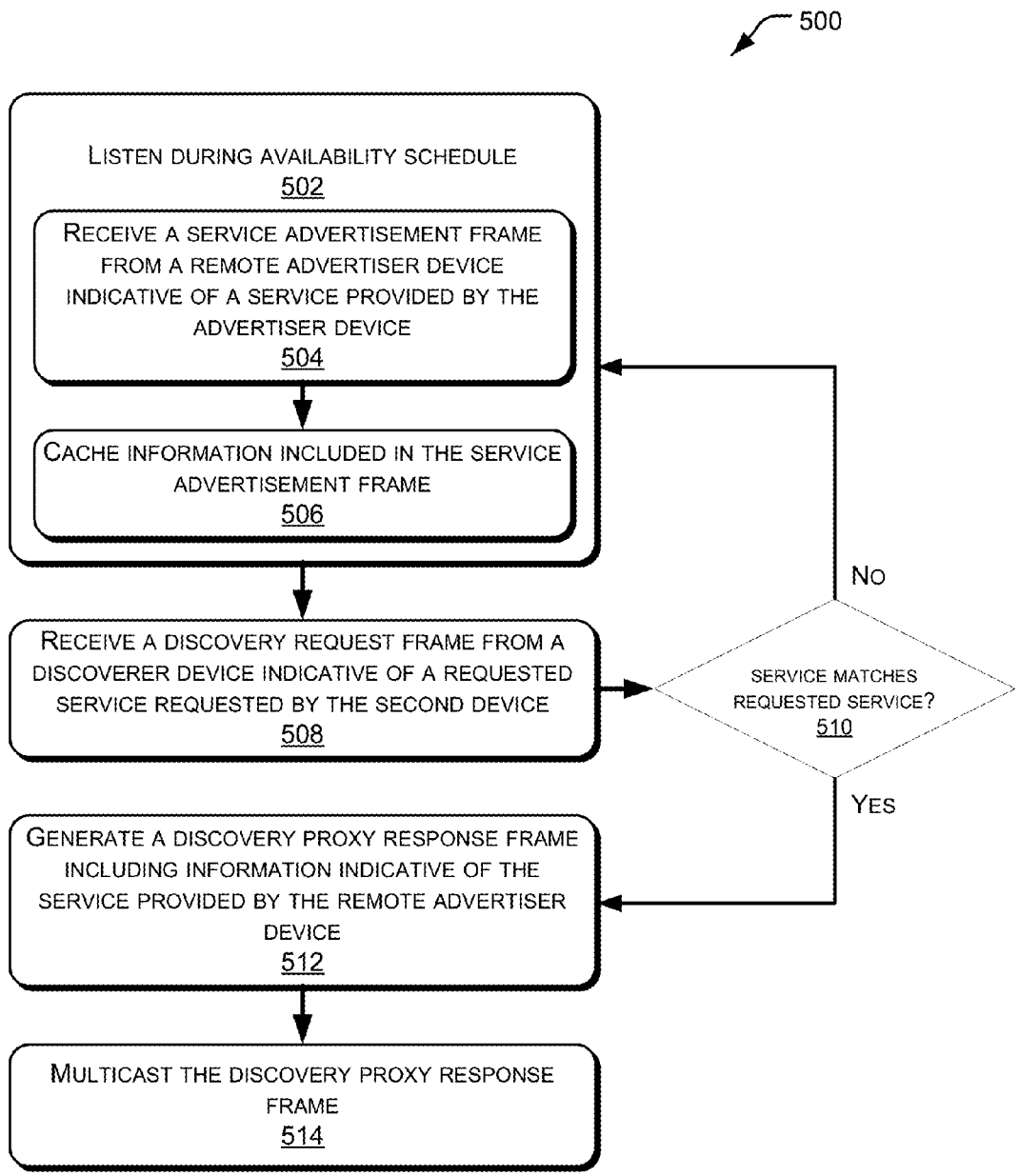
FIG. 5 is a flow chart showing a process related to discovery proxy response for service constraint advertisement and discovery using multicast in accordance with an embodiment of the present disclosure.

FIG. 5 illustrates a process 500 related to discovery proxy response for service constraint advertisement and discovery using multicast in accordance with an embodiment of the present disclosure. Process 500 depicts a scenario in which a wireless device multicasts a discovery proxy response frame. Process 500 begins at block 502.

At block 502, the wireless device listens for frames from other wireless devices during its availability schedule. Block 502 may include sub-blocks 504 and 506. Note that the wireless device could be either an advertiser device or a discoverer device, and may generally be referred to as a proxy device.

At block 504, the wireless device receives a service advertisement frame multicasted from a remote advertiser device. The service advertisement frame may include information indicative of a service provided by the remote advertiser device and information about the remote advertiser device that can be used by other devices to communicate with the remote advertiser device and access the service on the remote advertiser device. The information about the remote advertiser device that can be used by other devices to communicate with the remote advertiser device and access the service on the remote advertiser device may include at least one of the following pieces of information: a frequency band used by the remote advertiser device, one or more IEEE 802.11 channels supported by the remote advertiser device in providing the service, one or more IEEE 802.11 channels preferred by the remote advertiser device in providing the service, one or more IEEE 802.11-level transports used by the remote advertiser device in providing the service, one or more capabilities of the remote advertiser device, and an availability schedule of the remote advertiser device for frame exchange. For example, the wireless device D may receive a service advertisement frame from the wireless device A that includes some or all of the information listed above.

In one embodiment, the one or more channels preferred by the remote advertiser device in providing the service comprises a plurality of channels preferred by the remote advertiser device listed in an order of preference.

In one embodiment, the one or more IEEE 802.11-level transports used by the remote advertiser device in providing the first service comprise one or more of an IEEE 802.11 extended service set (ESS), an IEEE 802.11 independent basic service set (iBSS), and Wi-Fi Direct.

In one embodiment, the availability schedule of the remote advertiser device comprises one or more channels on which the remote advertiser device will be available for frame exchange, a duration for an availability window during which that the remote advertiser device will be available on the one or more channels, a start time that the availability window starts, and a number of times the availability window will repeat.

At block 506, the wireless device caches the information included in the service advertisement frame. For example, the wireless device D may cache the information included in the service advertisement frame received from the wireless device A.

At block 508, the wireless device receives a discovery request frame multicasted from a remote discoverer device. The discovery request frame may include information indicative of a service requested by the remote discoverer device and information about the remote discoverer device that can be used by other device to communicate with the remote discoverer device and provide the service to the remote discoverer device. The information about the remote discoverer device that can be used by other device to communicate with the remote discoverer device and provide the service to the remote discoverer device may include at least one of the following pieces of information: a frequency band used by the remote discoverer device, one or more IEEE 802.11 channels supported by the remote discoverer device in accessing the service, one or more IEEE 802.11 channels preferred by the remote discoverer device in accessing the service, one or more IEEE 802.11-level transports used by the remote discoverer device in accessing the service, one or more capabilities of the remote discoverer device, and an availability schedule of the remote discoverer device for frame exchange. For example, the wireless device D may receive a discovery request frame from the wireless device B requesting for a service.

In one embodiment, the one or more channels preferred by the remote discoverer device in accessing the service comprises a plurality of channels preferred by the remote discoverer device listed in an order of preference.

In one embodiment, the one or more IEEE 802.11-level transports used by the remote discoverer device in accessing the service comprise one or more of an IEEE 802.11 extended service set (ESS), an IEEE 802.11 independent basic service set (iBSS), and Wi-Fi Direct.

In one embodiment, the availability schedule of the remote discoverer device comprises one or more channels on which the remote discoverer device will be available for frame exchange, a duration for an availability window during which that the remote discoverer device will be available on the one or more channels, a start time that the availability window starts, and a number of times the availability window will repeat.

At block 510, the wireless device determines whether the service provided by the remote advertiser device matches the service requested by the remote discoverer device. For example, the wireless device D may determine whether the service provided by the wireless device A matches the service requested by the wireless device B. If the determination result is negative, the process 500 returns to block 502; otherwise the process 500 proceeds to block 512.

At block 510, the wireless device determines whether the first service provided by the first device matches the second service requested by the second device. For example, the wireless device D may determine whether the first service provided by the wireless device A matches the second service requested by the wireless device B. If the determination result is negative, the process 500 returns to block 502; otherwise the process 500 proceeds to block 512.

At block 512, the wireless device generates a discovery proxy response frame. The discovery proxy response frame may include information indicative of the service provided by the remote advertiser device and information about the remote advertiser device that can be used by other devices to communicate with the remote advertiser device and access the service on the remote advertiser device. The information about the remote advertiser device that can be used by other devices to communicate with the remote advertiser device and access the service on the remote advertiser device may include at least one of the following pieces of information: the frequency band used by the remote advertiser device, the one or more IEEE 802.11 channels supported by the remote advertiser device, the one or more channels preferred by the remote advertiser device in providing the service, the one or more IEEE 802.11-level transports used by the remote advertiser device in providing the service, the one or more capabilities of the remote advertiser device, and the availability schedule of the remote advertiser device. For example, upon determining that the service provided by the wireless device A matches the service requested by the wireless device B, the wireless device D may generate a discovery proxy response frame.

In one embodiment, the wireless device generates the discovery proxy response frame in response to not receiving from another device a discovery response frame or a proxy response frame that responds to the discovery request frame during a back-off period that starts from a time the discovery request frame is received. The length of the back-off period may be randomly set by the wireless device. For example, before generating the discovery proxy response frame, the wireless device D may wait for a back-off period to see if any other of the wireless devices would multicast a discovery response frame or a discovery proxy response frame, and generate the discovery proxy response frame if no discovery response frame or discovery proxy response frame in response to the discovery request frame is received from the other wireless devices during the back-off period.

At block 514, the wireless device multicasts the discovery proxy response frame. For example, the wireless device D may multicast the discovery proxy response frame that can be received by a number of other wireless devices. Prior to multicasting the discovery proxy response frame, the wireless device may use the information from the discovery request frame about the remote discoverer device that can be used by other devices to communicate with the remote discoverer device and provide the service to the remote discoverer device to configure the wireless device for multicasting the discovery proxy response frame.

In one embodiment, the wireless device multicasts the discovery proxy response frame when at least one of the following is true: (1) the availability schedule of the remote advertiser device has not expired and at least a first minimum amount of time remains in the availability schedule of the remote advertiser device on the one or more IEEE 802.11 channels supported by the remote advertiser device, (2) at least a second minimum amount of time remains in the availability schedule for the remote discoverer device on the one or more IEEE 802.11 channels supported by the remote discoverer device, (3) the discovery request frame was received at a data rate equal to or higher than a threshold data rate, (4) the discovery request frame was received within a first duration before multicasting the discovery proxy response frame, (5) the service advertisement frame was received within a second duration before multicasting the discovery proxy response frame, and (6) no other proxy device has responded to the discovery request frame.

Example Computing Device

Figure 6:
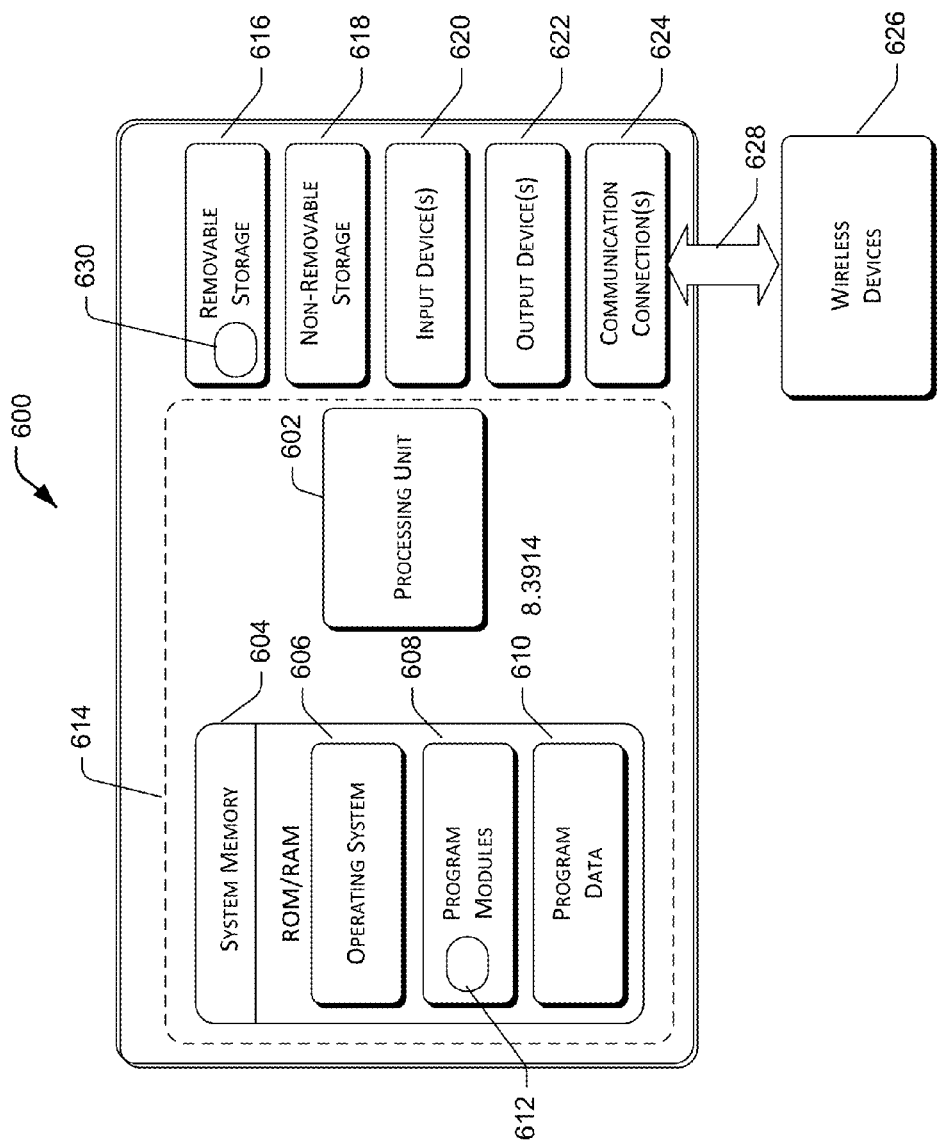
FIG. 6 is a block diagram of an example computing device that implements service constraint advertisement and discovery using multicast in accordance with an embodiment of the present disclosure.

FIG. 6 illustrates an example computing device 600 that implements service constraint advertisement and discovery using multicast. However, it will be readily appreciated that the techniques disclosed herein may be implemented in other computing devices, systems, and environments. The computing device 600 shown in FIG. 6 is one example of a computing device and is not intended to suggest any limitation as to the scope of use or functionality of the computer and network architectures. The computing device 600 may be an example of any, some, or all of the wireless devices A-G of FIG. 1.

In at least one implementation, computing device 600 typically includes at least one processing unit 602 and system memory 604. In some embodiments, processing unit 602 is a processing unit in a network interface in computing device 600 (and hence the operations performed by computing device 600 may occur in the network interface).

Depending on the exact configuration and type of computing device, system memory 604 may be volatile (such as RAM), non-volatile (such as ROM, flash memory, etc.) or some combination thereof. System memory 604 may include an operating system 606, one or more program modules 608, and may include program data 610. A basic implementation of the computing device 600 is demarcated by a dashed line 614.

The program module 608 may include a module 612 configured to implement the scheme as described above.

Computing device 600 may have additional features or functionality. For example, computing device 600 may also include additional data storage devices such as removable storage 616 and non-removable storage 618. In certain implementations, the removable storage 616 and non-removable storage 618 are an example of computer accessible media for storing instructions that are executable by the processing unit 602 to perform the various functions described above. Generally, any of the functions described with reference to the figures can be implemented using software, hardware (e.g., fixed logic circuitry) or a combination of these implementations. Program code may be stored in one or more computer accessible media or other computer-readable storage devices. Thus, the processes and components described herein may be implemented by a computer program product. As mentioned above, computer accessible media includes volatile and non-volatile, removable and non-removable media implemented in any process or technology for storage of information, such as computer readable instructions, data structures, program modules, or other data. The terms "computer accessible medium" and "computer accessible media" refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that can be used to store information for access by a computing device, e.g., computing device 600. Any of such computer accessible media may be part of the computing device 600.

In one implementation, the removable storage 616, which is a computer accessible medium, has a set of instructions 630 stored thereon. When executed by the processing unit 602, the set of instructions 630 cause the processing unit 602 to execute operations, tasks, functions and/or processes as described above and any variations thereof.

Computing device 600 may also include one or more input devices 620 such as keyboard, mouse, pen, voice input device, touch input device, etc. Computing device 600 may additionally include one or more output devices 622 such as a display, speakers, printer, etc.

Computing device 600 may also include one or more communication connections 624 that allow the computing device 600 to communicate with one or more wireless devices 626, such as wireless devices A-G, over wireless connection 628 based on Wi-Fi, Wi-Fi Direct, IEEE 802.11 standards, or a combination thereof.

Additional Notes

In the Detailed Description, numerous specific details are set forth in order to provide a thorough understanding of the present disclosure. However, those of ordinary skill in the art would appreciate that the present disclosure may be practiced without these specific details. In other instances, well-known methods, procedures, components and circuits have not been described in detail so as not to obscure the present disclosure.

Realizations in accordance with the present disclosure have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the present disclosure as defined in the claims that follow.

What is claimed is:

1. A method for communicating between electronic devices, comprising:
   in an advertiser device, performing operations for:
      receiving a discovery request frame from a discoverer device, the discovery request frame including information indicative of a service requested by the discoverer device and information about the discoverer device that can be used by other electronic devices to communicate with the discoverer device and provide the service to the discoverer device;

generating a discovery response frame that includes information indicative of a service provided by the advertiser device that matches the service requested by the discoverer device and information about the advertiser device that can be used by other electronic devices to communicate with the advertiser device and access the service provided by the advertiser device, wherein generating the discovery response frame is performed in response to at least a minimum amount of time remaining in an availability schedule for the discoverer device on a channel supported by the discoverer device; and transmitting the discovery response frame.

2. The method of claim 1, wherein the information about the discoverer device further includes at least one of:

a frequency band used by the discoverer device, one or more channels preferred by the discoverer device in accessing the service, one or more transports used by the discoverer device in accessing the service, one or more capabilities of the discoverer device, and the availability schedule of the discoverer device.

3. The method of claim 2, wherein the one or more transports used by the discoverer device in accessing the service comprise one or more of an extended service set (ESS), an independent basic service set (iBSS), and Wi-Fi Direct.

4. The method of claim 2, wherein the availability schedule of the discoverer device comprises one or more channels on which the discoverer device will be available for frame exchange, a duration for an availability window during which the discoverer device will be available on the one or more channels, a start time at which the availability window of the discoverer device starts, and a number of times the availability window of the discoverer device will repeat.

5. The method of claim 1, wherein generating the discovery response frame comprises generating the discovery response frame in response to the discovery request frame being received at a data rate equal to or higher than a threshold data rate.

6. The method of claim 1, further comprising:
in the advertiser device, performing operations for:
caching the information included in the discovery request frame for a defined duration; and
during the defined duration:
determining that a remote advertiser device provides a service that matches the service requested based at least in part on cached information indicative of the service provided by the remote advertiser device and information about the remote advertiser device that can be used by other electronic devices to communicate with the remote advertiser device and access the service on the remote advertiser device;
generating a discovery proxy response frame that includes the information indicative of the service provided by the remote advertiser device and information about the remote advertiser device that can be used by other electronic devices to communicate with the remote advertiser device and access the service on the remote advertiser device;
using the information from the discovery request frame about the discoverer device that can be used by other electronic devices to communicate with the discoverer device and provide the service to the discoverer device to configure the advertiser device for multicasting the discovery proxy response frame; and
multicasting the discovery proxy response frame.

7. The method of claim 1, further comprising:
in the advertiser device, performing operations for:
caching the information about the discoverer device that can be used by other electronic devices to communicate with the discoverer device and provide the service to the discoverer device that is received in the discovery request frame; and
selecting an availability schedule for the advertiser device based at least in part on the cached information, wherein the availability schedule of the advertiser device comprises one or more channels on which the advertiser device will be available for frame exchange, a duration for an availability window during which the advertiser device will be available on the one or more channels, a start time at which the availability window of the advertiser device starts, and a number of times the availability window of the advertiser device will repeat.

8. The method of claim 1, further comprising:
in the advertiser device, comprising operations for:
receiving, from a software client executed in the advertiser device, a request for a service needed by the software client;
generating a second discovery request frame that includes information indicative of the service requested by the software client and information about the advertiser device that can be used by other electronic devices to communicate with the advertiser device and provide the service to the software client; and
multicasting the second discovery request frame.

9. The method of claim 8, wherein the information about the advertiser device that can be used by other electronic devices to communicate with the advertiser device and provide the service to the advertiser device includes at least one of:

a frequency band used by the advertiser device, one or more channels supported by the advertiser device in accessing the service, one or more channels preferred by the advertiser device in accessing the service, one or more transports used by the advertiser device in accessing the service, one or more capabilities of the advertiser device, and an availability schedule of the advertiser device for frame exchange.

10. The method of claim 8, further comprising:
in the advertiser device, performing operations for:
determining that information in a cache in the advertiser device that was received from another electronic device includes the service requested by the software client; and
returning the information from the cache to the software client.

11. The method of claim 8, further comprising:
in the advertiser device, performing operations for:
receiving, from a remote advertiser device, a multicasted second discovery response frame, the second discovery response frame including information indicative of a service provided by the remote advertiser device and information about the remote advertiser device that can be used by other electronic devices to communicate with the remote advertiser device and access the service on the remote advertiser device; and providing at least some of the information from the second discovery response frame to the software client.

12. The method of claim 1, wherein the information about the advertiser device includes an availability schedule during which the advertiser device will be available to receive frames transmitted from the discovery device and transmit frames to the discovery device.

13. The method of claim 12, wherein the availability schedule of the advertiser device comprises one or more channels on which the advertiser device will be available for frame exchange, a duration for an availability window during which the advertiser device will be available on the one or more channels, a start time at which the availability window of the advertiser device starts, and a number of times the availability window of the advertiser device will repeat.

14. A method for communicating between electronic devices, comprising:

in a discoverer device, performing operations for:
receiving, from a software client executing in the discoverer device, a request for a service needed by the software client;
generating a discovery request frame that includes information indicative of the service requested by the software client and information about the discoverer device that can be used by other electronic devices to communicate with the discoverer device and provide the service to the software client;
transmitting the discovery request frame to an advertiser device in response to at least a minimum amount of time remaining in an availability schedule for the discoverer device on a channel supported by the discoverer device; and
receiving, in response to the transmitting, a discovery response frame from the advertiser device, the discovery response frame including information indicative of a service provided by the advertiser device that matches the service requested by the software client in the discoverer device and information about the advertiser device that can be used by other electronic devices to communicate with the advertiser device and access the service provided by the advertiser device.

15. The method of claim 14, wherein the information about the discoverer device that can be used by other electronic devices to communicate with the discoverer device and provide the service to the discoverer device further includes at least one of:

a frequency band used by the discoverer device, one or more channels preferred by the discoverer device in accessing the service, one or more capabilities of the discoverer device, one or more transports used by the discoverer device in accessing the service, and the availability schedule of the discoverer device.

16. The method of claim 15, wherein the one or more transports used by the discoverer device in accessing the service comprise one or more of an extended service set (ESS), an independent basic service set (iBSS), and Wi-Fi Direct.

17. The method of claim 15, wherein the availability schedule of the discoverer device comprises one or more channels on which the discoverer device will be available for frame exchange, a duration for an availability window during which the discoverer device will be available on the one or more channels, a start time at which the availability window of the discoverer device starts, and a number of times the availability window of the discoverer device will repeat.

18. The method of claim 14, wherein the information about the advertiser device that can be used by other electronic devices to communicate with the advertiser device and provide the service to the advertiser device includes at least one of:

a frequency band used by the advertiser device, one or more channels supported by the advertiser device in accessing the service, one or more channels preferred by the advertiser device in accessing the service, one or more transports used by the advertiser device in accessing the service, one or more capabilities of the advertiser device, and an availability schedule of the advertiser device for frame exchange.

19. The method of claim 14, further comprising:
providing at least some of the information from the discovery response frame to the software client.

20. The method of claim 14, further comprising:
receiving a proxy discovery response frame from the advertiser device that includes information indicative of the service provided by a remote advertiser device and information about the remote advertiser device that can be used by other electronic devices to communicate with the remote advertiser device and access the service on the remote advertiser device.

21. The method of claim 20, wherein the information about the remote advertiser device that can be used by other electronic devices to communicate with the remote advertiser device and provide the service to the remote advertiser device includes at least one of:

a frequency band used by the remote advertiser device, one or more channels supported by the remote advertiser device in accessing the service, one or more channels preferred by the remote advertiser device in accessing the service, one or more transports used by the remote advertiser device in accessing the service, one or more capabilities of the remote advertiser device, and an availability schedule of the remote advertiser device for frame exchange.

22. A non-transitory tangible computer-readable device having instructions stored thereon that, when executed by at least one computing device, causes the at least one computing device to perform operations comprising:

receiving a discovery request frame from a discoverer device, the discovery request frame including information indicative of a service requested by the discoverer device and including information about the discoverer device that can be used by other electronic devices to communicate with the discoverer device and provide the service to the discoverer device;
generating a discovery response frame that includes information indicative of a service provided by the computer-readable device that matches the service requested by the discoverer device and information about the computer-readable device that can be used by other electronic devices to communicate with the computer-readable device and access the service provided by the computer-readable device, wherein generating the discovery response frame is performed in response to at least a minimum amount of time remaining in an availability schedule for the discoverer device on a channel supported by the discoverer device; and
transmitting the discovery response frame.

23. The computer-readable device of claim 22, wherein the information about the discoverer device further includes at least one of:
a frequency band used by the discoverer device, one or more channels preferred by the discoverer device in accessing the service, one or more transports used by the discoverer device in accessing the service, one or more capabilities of the discoverer device, and the availability schedule of the discoverer device.

24. The computer-readable device of claim 23, wherein the one or more transports used by the discoverer device in accessing the service comprise one or more of an extended service set (ESS), an independent basic service set (iBSS), and Wi-Fi Direct.

25. The computer-readable device of claim 23, wherein the availability schedule of the discoverer device comprises one or more channels on which the discoverer device will be available for frame exchange, a duration for an availability window during which the discoverer device will be available on the one or more channels, a start time at which the availability window of the discoverer device starts, and a number of times the availability window of the discoverer device will repeat.

26. The computer-readable device of claim 23, wherein generating the discovery response frame comprises generating the discovery response frame in response to the discovery request frame being received at a data rate equal to or higher than a threshold data rate.

27. The computer-readable device of claim 22, the operations further comprising:
caching the information included in the discovery request frame for a defined duration; and
during the defined duration:
determining that a remote advertiser device provides a service that matches the service requested based at least on cached information indicative of the service provided by the remote advertiser device and information about the remote advertiser device that can be used by other electronic devices to communicate with the remote advertiser device and access the service on the remote advertiser device;
generating a discovery proxy response frame that includes the information indicative of the service provided by the remote advertiser device and information about the remote advertiser device that can be used by other electronic devices to communicate with the remote advertiser device and access the service on the remote advertiser device;
configuring the computer-readable device to multicast the discovery proxy response frame based at least in part on the information from the discovery request frame about the discoverer device; and
multicasting the discovery proxy response frame.

28. The computer-readable device of claim 22, further comprising:
caching the information about the discoverer device that can be used by other electronic devices to communicate with the discoverer device and provide the service to the discoverer device that is received in the discovery request frame; and
selecting an availability schedule for the computer-readable device based at least in part on the cached information, wherein the availability schedule of the computer-readable device comprises one or more channels on which the computer-readable device will be available for frame exchange, a duration for an availability window during which the computer-readable device will be available on the one or more channels, a start time at which the availability window of the computer-readable device starts, and a number of times the availability window of the computer-readable device will repeat.

29. The computer-readable device of claim 22, the operations further comprising:
receiving a request for a service needed by a software client;
generating a second discovery request frame that includes information indicative of the service requested by the software client and information about the computer-readable device that can be used by other electronic devices to communicate with the computer-readable device and provide the service to the computer-readable device; and
multicasting the second discovery request frame.

30. The computer-readable device of claim 29, wherein the information about the computer-readable includes at least one of:
a frequency band used by the computer-readable device, one or more channels supported by the computer-readable device in accessing the service, one or more channels preferred by the computer-readable device in accessing the service, one or more transports used by the computer-readable device in accessing the service, one or more capabilities of the computer-readable device, and an availability schedule of the computer-readable device for frame exchange.

31. The computer-readable device of claim 29, the operations further comprising:
determining that information in a cache in the computer-readable device that was received from another electronic device includes the service requested by the software client; and
returning the information from the cache to the software client.

32. The computer-readable device of claim 29, the operations further comprising:
receiving, from a remote advertiser device, a multicasted second discovery response frame, the second discovery response frame including information indicative of a service provided by the remote advertiser device and information about the remote advertiser device that can be used by other electronic devices to communicate with the remote advertiser device and access the service on the remote advertiser device; and
providing at least some of the information from the second discovery response frame to the software client.

33. A non-transitory tangible computer-readable device having instructions stored thereon that, when executed by at least one computing device, causes the at least one computing device to perform operations comprising:
receiving a request for a service needed by a software client;
generating a discovery request frame that includes information indicative of the service requested by the software client and information about the computer-readable device that can be used to communicate with the computer-readable device and provide the service to the software client;
multicasting the discovery request frame to an advertiser device when at least one of the following is true:
at least a minimum amount of time remains in an availability schedule for the computer-readable device on one or more channels supported by the computer-readable device; and the discovery request frame is to be multicasted at a data rate equal to or higher than a threshold data rate; and receiving, in response to the multicasting, a discovery response frame from the advertiser device, wherein the advertiser device is configured for multicasting based at least on the information about the computer-readable device that can be used by other electronic devices to communicate with the computer-readable device and provide the service to the software client, and the discovery response frame includes information indicative of a service provided by the advertiser device and information about the advertiser device that can be used by other electronic devices to communicate with the advertiser device and access the service of the advertiser device.

34. The computer-readable device of claim 33, wherein the information about the computer-readable device further includes at least one of:
one or more channels preferred by the computer-readable device in accessing the service, one or more transports used by the computer-readable device in accessing the service, one or more capabilities of the computer-readable device, a frequency band used by the computer-readable device, and the availability schedule of the computer-readable device.

35. The computer-readable device of claim 34, wherein the one or more transports used by the computer-readable device in accessing the service comprise one or more of an extended service set (ESS), an independent basic service set (iBSS), and Wi-Fi Direct.

36. The computer-readable device of claim 34, wherein the availability schedule of the computer-readable device comprises one or more channels on which the computer-readable device will be available for frame exchange, a duration for an availability window during which the computer-readable device will be available on the one or more channels, a start time at which the availability window of the computer-readable device starts, and a number of times the availability window of the computer-readable device will repeat.

37. The computer-readable device of claim 33, wherein the information about the advertiser device that can be used by other electronic devices to communicate with the advertiser device and provide the service to the advertiser device includes at least one of:
a frequency band used by the advertiser device, one or more channels supported by the advertiser device in accessing the service, one or more channels preferred by the advertiser device in accessing the service, one or more transports used by the advertiser device in accessing the service, one or more capabilities of the advertiser device, and an availability schedule of the advertiser device for frame exchange.

38. The computer-readable device of claim 33, the operations further comprising:
providing at least some of the information from the discovery response frame to the software client.

39. The computer-readable device of claim 33, the operations further comprising:
receiving, from the advertiser device, a discovery proxy response frame that includes information indicative of the service provided by a remote advertiser device and information about the remote advertiser device that can be used by other electronic devices to communicate with the remote advertiser device and access the service on the remote advertiser device, wherein the remote advertiser device is a different device than the advertiser device.

40. The computer-readable device of claim 39, wherein the information about the remote advertiser device that can be used by other electronic devices to communicate with the remote advertiser device and provide the service to the remote advertiser device includes at least one of:
a frequency band used by the remote advertiser device, one or more channels supported by the remote advertiser device in accessing the service, one or more channels preferred by the remote advertiser device in accessing the service, one or more transports used by the remote advertiser device in accessing the service, one or more capabilities of the remote advertiser device, and an availability schedule of the remote advertiser device for frame exchange.

41. A method for communicating between electronic devices, comprising:
in an advertiser device, performing operations for:
receiving a discovery request frame multicasted from a discoverer device, the discovery request frame including information indicative of a service requested by the discoverer device and information about the discoverer device that can be used by other electronic devices to communicate with the discoverer device and provide the service to the discoverer device, the information about the discoverer device including an availability schedule during which the discoverer device will be available to receive frames transmitted from the advertiser device and transmit frames to the advertiser device;
determining that the service requested by the discoverer device matches a service provided by the advertiser device;
generating a discovery response frame that includes information indicative of a service provided by the advertiser device and information about the advertiser device that can be used by other electronic devices to communicate with the advertiser device and access the service provided by the advertiser device, wherein generating the discovery response frame is performed when at least one of the following is true:
at least a minimum amount of time remains in an availability schedule for the discoverer device on the one or more channels supported by the discoverer device; and
the discovery request frame was received at a data rate equal to or higher than a threshold data rate;
using the information from the discovery request frame about the discoverer device that can be used by other electronic devices to communicate with the discoverer device to configure the advertiser device for multicasting the discovery response frame; and
multicasting the discovery response frame.

* * * * *

UNITED STATES PATENT AND TRADEMARK OFFICE
CERTIFICATE OF CORRECTION

PATENT NO.        : 9,661,558 B2                                             Page 1 of 1
APPLICATION NO.   : 13/719004
DATED             : May 23, 2017
INVENTOR(S)       : Charles F. Dominguez It is certified that error appears in the above-identified patent and that said Letters Patent is hereby corrected as shown below:

In the Claims

Claim 41, Column 26, Line 42, "indicative of a service" should read --indicative of the service--.

Signed and Sealed this
Ninth Day of January, 2018

Joseph Matal
*Performing the Functions and Duties of the*
*Under Secretary of Commerce for Intellectual Property and*
*Director of the United States Patent and Trademark Office*